United States Patent [19]
O'Brien et al.

[11] Patent Number: 5,932,060
[45] Date of Patent: Aug. 3, 1999

[54] PAPER RELEASE LAMINATES HAVING IMPROVED RELEASE CHARACTERISTICS

[75] Inventors: Michael J. O'Brien, Clifton Park; Roy M. Griswold, Ballston Spa, both of N.Y.

[73] Assignee: General Electric Company, Waterford, N.Y.

[21] Appl. No.: 08/928,810

[22] Filed: Sep. 12, 1997

[51] Int. Cl.$^6$ .................................................. C09J 183/04
[52] U.S. Cl. .......................... 156/329; 428/447; 525/478
[58] Field of Search ........................... 156/329; 428/447; 525/478

[56] References Cited

U.S. PATENT DOCUMENTS

| | | |
|---|---|---|
| 3,159,601 | 12/1964 | Ashby . |
| 3,159,662 | 12/1964 | Ashby . |
| 3,344,111 | 9/1967 | Chalk . |
| 3,418,731 | 12/1968 | Anclaux . |
| 3,419,593 | 12/1968 | Willing . |
| 3,445,420 | 5/1969 | Kookootsedes et al. . |
| 3,461,185 | 8/1969 | Brown . |
| 3,715,334 | 2/1973 | Karstedt . |
| 3,775,452 | 11/1973 | Karstedt . |
| 3,814,730 | 6/1974 | Karstedt . |
| 3,882,083 | 5/1975 | Berger et al. . |
| 3,989,667 | 11/1976 | Lee et al. . |
| 4,043,977 | 8/1977 | deMontigny et al. . |
| 4,047,596 | 9/1977 | Winkler . |
| 4,061,609 | 12/1977 | Bobear . |
| 4,337,332 | 6/1982 | Melancon et al. . |
| 4,347,346 | 8/1982 | Eckberg . |
| 4,386,135 | 5/1983 | Campbell et al. . |
| 4,448,815 | 5/1984 | Grenoble et al. . |
| 4,465,818 | 8/1984 | Shirahata et al. . |
| 4,472,563 | 9/1984 | Chandra et al. . |
| 4,476,166 | 10/1984 | Eckberg . |
| 4,533,575 | 8/1985 | Melancon . |
| 4,562,096 | 12/1985 | Lo et al. . |
| 4,698,386 | 10/1987 | Fujimoto . |
| 4,736,048 | 4/1988 | Brown et al. . |
| 4,772,515 | 9/1988 | Hara et al. . |
| 4,774,111 | 9/1988 | Lo . |
| 4,783,552 | 11/1988 | Lo et al. . |
| 5,036,117 | 7/1991 | Chung et al. . |
| 5,077,369 | 12/1991 | de Montigny et al. . |
| 5,082,706 | 1/1992 | Tangney . |
| 5,281,455 | 1/1994 | Braun et al. . |
| 5,516,558 | 5/1996 | O'Brien . |
| 5,616,672 | 4/1997 | O'Brien et al. . |

*Primary Examiner*—Melvyn I. Marquis
*Attorney, Agent, or Firm*—Kenneth S. Wheelock; Michelle Bugbee

[57] ABSTRACT

Substantially branched alkenyl silicone polymer compositions having on average at least two branching points per molecule provide laminate release compositions that provide releasable laminates against methyl and phenyl silicone pressure sensitive adhesives.

25 Claims, No Drawings

PAPER RELEASE LAMINATES HAVING IMPROVED RELEASE CHARACTERISTICS

FIELD OF THE INVENTION

The present invention relates to curable alkenyl based silicone release coating compositions for laminate release applications. The present invention provides for releasable compositions when laminated against methyl or phenyl silicone pressure sensitive adhesives.

BACKGROUND OF THE INVENTION

Curable silicone compositions are applied to paper substrates to aid in the release of adhesive materials thereon. Laminates comprising a paper release substrate coated with a pressure sensitive adhesive and a sheet material that can be a decorative lamina or label are used by stripping off the release liner which is discarded and affixing the lamina or label onto a surface.

Typically these release compositions cure by one of two mechanisms, thermal curing or photo-catalytic curing. Thermally curing laminate release systems generally are comprised of the following compositions:

(A) a linear alkenyl substituted polysiloxane polymer that is the primary component or base polymer of the curable composition;

(B) an hydrosilylation addition cure catalysts, typically either a platinum or rhodium based catalyst;

(C) a cure inhibiting compound or mixtures thereof to increase the useful life of the coating bath; and (D) a hydride functional cross-linking silicone, typically a methyl hydrogen siloxane polymer, copolymer or oligomer.

While the general practice usually employs linear base polymers, (A), solventless, high solids content formulations have been described. As described in U.S. Pat. No. 4,448,815 ('815) a linear alkenyl siloxane base copolymer is a copolymer of:

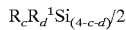

$$R_c R_d^1 Si_{(4-c-d)/2} \qquad 1)$$

where R is generally an alkyl radical, $R^1$ is a low molecular weight olefinic substituent such as vinyl or allyl, c has value from 0 to 2 and the average of value of the sum c+d is 0.8 to 3; and

$$R_n SiO_{4-n}/2 \qquad 2)$$

where R is generally an alkyl radical and n has a value of 0.8 to 2.5. The preferred base copolymer of the '815 patent has the following linear structure:

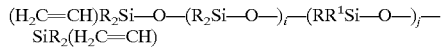

$$(H_2C=CH)R_2Si-O-(R_2Si-O-)_i-(RR^1Si-O-)_j-SiR_2(H_2C=CH)$$

where the subscripts i and j are integers.

U.S. Pat. No. 4,774,111 ('111) describes a variation of the above linear copolymer where the R group in formula 2 is selected from alkyl and alkenyl radicals. The polymer of the '111 patent is defined as being substantially linear, i.e. having no more than a trace amount of T or Q groups. This substantially linear requirement for alkenyl functional heat curing silicone release compositions is repeated in U.S. Pat. Nos. 4,772,515; 4,783,552 and 5,036,117.

In contrast, the possibility of branched alkenyl polymers is admitted by the structural formulas recited in U.S. Pat. No. 4,057,596 ('596). In the '596 patent the composition comprises:

(A') a substantially linear vinyl chainstopped polymer;

(B') a linear methyl hydrogen polymer;

(C') a methyl vinyl polysiloxane having at least three vinyl groups per molecule;

(D') a methyl hydrogen polysiloxane having at least three hydride hydrogen atoms per molecule; and (E') a platinum hydrosilylation catalyst.

Component (C') is described in the '596 patent as containing $(H_2C=CH)(CH_3)SiO_{2/2}$ ($D^{vi}$), $(H_2C=CH)(CH_3)_2SiO_{1/2}$ ($M^{vi}$), and $(H_2C=CH)SiO_{3/2}$ ($T^{vi}$), units either singly or in combination with $(CH_3)_2SiO_{2/2}$ (D), $(CH_3)_3SiO_{1/2}$ (M), and $(CH_3)SiO_{3/2}$ (T). The optional inclusion of vinyl substituted T units and methyl T units permits the composition of the '596 patent to possess branched structures.

U.S. Pat. No. 4,386,135 describes a terminally unsaturated silicone polymer having the formula

$$R_{4-a}Si((R_2SiO-)_b OSiR_2R^2)_a \qquad 3)$$

where a may be 2, 3, or 4. When a=4 the formula produces a Q resin. When a=3, a T structure results and the structure possesses only a single branch point. When a=2, the formula devolves to an alkenyl chain stopped linear polymer.

The alkenyl functional silicone polymer laminate release compositions typically used fall into one of two categories:

1) a linear alkenyl chainstopped polymer:

$$M^{vi} D_x M^{vi} \qquad 4)$$

where $M^{vi}$ indicates an alkenyl chainstopping M group or 2) multi-functional alkenyl copolymers:

$$M^{vi} D_x D^{vi}_y M^{vi} \qquad 5)$$

where $D^{vi}$ indicates an alkenyl substituted D group. The alkenyl chain stopped polymers, $M^{vi} D_x M^v$, generally cure faster than the multi-functional copolymers, $M^{vi} D_x D^{vi}_y M^{vi}$. As laminate release composites are delaminated, the formulations based on the linear alkenyl chainstopped polymers show significant increases in the delamination force necessary as delamination speed increases. In contrast, while the multi-functional alkenyl polymers tend to have a slower curing speed the increase in delamination force with increasing delamination speed is not nearly as great proportionately.

U.S. Pat. No. 5,616,672 ('672) provides for a substantially branched alkenyl silicone polymer composition having on average at least two branch points per molecule that provide paper release compositions wherein the delamination force is reduced at all delamination speeds. U.S. Pat. No. 4,736,048 ('048) specifically teaches that methyl silicone release coatings do not release when laminated against methyl silicone pressure sensitive adhesives. The failure of methyl silicone release coatings to release against methyl silicone pressure sensitive adhesives has been partially solved by recourse to fluorinated silicone compositions as taught in U.S. Pat. No. 4,889,753 ('753) and the '048 patent. While the formulas describing the fluorosilicones of the '753 and '048 patents admit branching of the structure the patents teach a limitation that the chain branching units should be present in only minor amounts. This preference for primarily linear species possessing only minimal branching is underscored by the teachings in U.S. Pat. Nos. 5,082,706 ('706) and 5,281,455 ('455) which utilize the polymers of the '048 and '753 patents.

Accordingly, it is desirable to provide a release laminate having the high cure speed of the alkenyl chainstopped polymers with the lower release force characteristics of substantially branched multi-functional alkenyl compositions, particularly against methyl and phenyl pressure sensitive adhesives. It would also be desirable to have the release force change as little as possible as a function of increasing delamination speed.

SUMMARY OF THE INVENTION

The present invention thus provides for a release laminate comprising:

a) a first laminate layer comprising a cured silicone composition comprising a substantially branched alkenyl silicone having the formula:

$$M^{vi}{}_a T_b D_c M_d$$

where
$M^{vi}=R_{3-p}R^1{}_p SiO_{1/2}$, where R is selected from the group consisting of one to forty carbon monovalent hydrocarbon radicals and $R^1$ is selected from the group consisting of two to forty carbon atom terminal olefinic monovalent hydrocarbon radicals, where p ranges from 1 to 3;
$T=R^2 SiO_{3/2}$ where $R^2$ is selected from the group consisting of R and $R^1$;
$D=R^3 R^4 SiO_{2/2}$ where $R^3$ and $R^4$ are each independently selected from the group consisting of R and $R^1$; and
$M=R_3 SiO_{1/2}$ where each R is as previously defined and is independently selected; wherein a and b have values ranging from 2 to 5 or greater, c is an integer ranging from about 50 to about 1,000 and d has a value ranging from 0 to about 0.5; and b) a second laminate layer in contact with the first layer comprising a silicone pressure sensitive adhesive. The subscript b has values of 2 or greater, preferably 3 or greater, more preferably 4 or greater and most preferably 5 or greater.

The present invention further provides for laminates wherein the silicone composition additionally comprises a substantially linear hydrogen siloxane selected from the group of compounds:

$MD_e D'_f M$, $M_{D'_f} M$, $MD_e D'_f M'$, $M' D_e D'_f M'$, and $M' D_e M'$ where $M=R'_3 SiO_{1/2}$, $M'=H_g R'_{3-g} SiO_{1/2}$, and $D=R'R' SiO_{2/2}$, and $D'=R'HSiO_{2/2}$ wherein each R' in M, M', D, and D' is independently selected from the group consisting of one to forty carbon monovalent hydrocarbon radicals wherein the subscripts e and f may be zero or positive whereby the sum of e and f ranges from about 10 to about 100 subject to the limitation that the sum of f and g is two or greater.

Preferred monovalent hydrocarbon radicals, R, are polyfluoro-alkyl moieties independently selected from the group of fluoro-alkyl substituents:

$$CF_3(CF_2)_n(CH_2)_m \text{ and } CF_3(CF_2)_n J(CH_2)_m;$$

where the subscript n is an number that ranges from 0 to about 20, preferably from about 2 to about 19, more preferably from about 3 to about 18 and most preferably from about 4 to about 18, where the subscript m is a number that ranges from about 0 to about 20, preferably from about 2 to about 10, more preferably from about 2 to 8 and most preferably from about 2 to 4, and J is a divalent methylene group ($CH_2$) or oxygen (O); or methyl.

DETAILED DESCRIPTION OF THE INVENTION

The present invention improves upon the art by providing a releasable laminate comprising a substantially branched alkenyl curable silicone composition of the formula $$M^{vi}{}_a T_b D_c M_d \qquad 6)$$

where
$M^{vi}=R_{3-p}R^1{}_p SiO_{1/2}$, where R is selected from the group consisting of one to forty carbon monovalent hydrocarbon radicals and $R^1$ is selected from the group consisting of two to forty carbon atom olefinic monovalent hydrocarbon radicals, where p ranges from 1 to 3; $T=R^2 SiO_{3/2}$ where $R^2$ is selected from the group consisting of R and $R^1$, $D=R^3 R^4 SiO_{2/2}$ where $R^3$ and $R^4$ are each independently selected from the group consisting of R and $R^1$, and $M=R_3 SiO_{1/2}$ where each R is independently selected and the subscripts a and b have values ranging from about 2 to about 5 and c is an integer ranging from about 50 to about 1,000 and d has a value ranging from 0 to 0.5, preferably from 0.25 to about 0.5, more preferably from about 0.35 to about 0.5 and most preferably from about 0.4 to about 0.5. Applicants define the term substantially branched to mean that the average number of T branching sites per alkenyl silicone molecule of (A) is at least two and preferably three; and a methyl or phenyl pressure sensitive adhesive.

The release laminates of the present invention thus comprise a first laminate layer comprising:

(A) a substantially branched alkenyl silicone having the formula:

$$M^{vi}{}_a T_b D_c M_d \qquad 6)$$

where the subscripts a, b, c, and d are as previously defined;

(B) a substantially linear hydrogen siloxane selected from the group of compounds:

$MD_e D'_f M$              7a)

$MD'_f M$,              7b)

$MD_e D'_f M'$              7c)

$M' D_e D'_f M'$,              7d)

and $M' D_e M'$              7e)

where M is as previously defined and $M' = H_g R_{3-g} SiO_{1/2}$ $D = RRSiO_{2/2}$ where each R is independently selected and $D' = RHSiO_{2/2}$ where R is as previously defined, the subscripts e and f may be zero or positive wherein the sum of e and f ranges from about 10 to about 100 subject to the limitation that the sum of f and g is two or greater.

(C) a hydrosilylation catalyst comprising a metal selected from the group consisting of nickel, palladium, platinum, rhodium, iridium, ruthenium and osmium; and (D) a cure inhibitor; and a second laminate layer in contact with the first layer comprising a silicone pressure sensitive adhesive.

The amounts of Components (A) and (B) that are used in the compositions of this invention are not narrowly limited. Said amounts, expressed in terms of the ratio of the number of silicon-bonded hydrogen atoms of Component (B) to the number of silicon-bonded olefinic hydrocarbon radicals of Component (A), as is typically done, are sufficient to provide a value for said ratio of from 1/100 to 100/1, usually from 1/20 to 20/1, and preferably from 1/2 to 20/1.

Broadly stated, Component (C) of the composition of this invention is a catalyst component which facilitates the reaction of the silicon-bonded hydrogen atoms of Component (B) with the silicon-bonded olefinic hydrocarbon radicals of Component (A) and can be any platinum-containing catalyst component. For example, Component (C) can be platinum metal; a carrier such as silica gel or powdered charcoal, bearing platinum metal; or a compound or complex of a platinum metal.

A typical platinum-containing catalyst component in the organopolysiloxane compositions of this invention is any form of chloroplatinic acid, such as, for example, the readily available hexahydrate form or the anhydrous form, because of its easy dispersibility in organosiloxane systems. A particularly useful form of chloroplatinic acid is that composition obtained when it is reacted with an aliphatically unsaturated organosilicon compound such as divinyltetramethyldisiloxane, as disclosed by U.S. Pat. No. 3,419,593 incorporated herein by reference.

The amount of platinum-containing catalyst component that is used in the compositions of this invention is not narrowly limited as long as there is a sufficient amount to accelerate a room temperature reaction between the silicon-bonded hydrogen atoms of Component (B) with the silicon-bonded olefinic hydrocarbon radicals of Component (A). The exact necessary amount of said catalyst component will depend upon the particular catalyst and is not easily predictable. However, for chloroplatinic acid said amount can be as low as one part by weight of platinum for every one million parts by weight of organosilicon Components (A) plus (B). Preferably said amount is at least 10 parts by weight, on the same basis.

For compositions of this invention which are to be used in the coating method of this invention the amount of platinum containing catalyst component to be used is preferably sufficient to provide from 10 to 500 parts by weight platinum per one million parts by weight of organopolysiloxane Components (A) plus (B).

The hydrosilylation catalyst is selected from the group consisting of catalyst comprising a metal selected from the group consisting of nickel, palladium, platinum, rhodium, iridium, ruthenium and osmium or as taught in U.S. Pat. Nos. 3,159,601; 3,159,662; 3,419,593; 3,715,334; 3,775,452 and 3,814,730.

Inhibitors, component (D), for the platinum group metal catalysts are well known in the organosilicon art. Examples of various classes of such metal catalyst inhibitors include unsaturated organic compounds such as ethylenically or aromatically unsaturated amides, U.S. Pat. No. 4,337,332; acetylenic compounds, U.S. Patent Nos. 3,445,420 and 4,347,346; ethylenically unsaturated isocyanates, U.S. Pat. No. 3,882,083; olefinic siloxanes, U.S. Pat. No. 3,989,667; unsaturated hydrocarbon diesters, U.S. Pat. Nos. 4,256,870; 4,476,166 and 4,562,096, and conjugated ene-ynes. U.S. Pat. Nos. 4,465,818 and 4,472,563; other organic compounds such as hydroperoxides, U.S. Pat. No. 4,061,609; ketones, U.S. Pat. No. 3,418,731; sulfoxides, amines, phosphines, phosphites, nitrites, U.S. Pat. No. 3,344,111; diaziridines, U.S. Pat. No. 4,043,977; half esters and half amides, U.S. Pat. No. 4,533,575; and various salts, such as U.S. Pat. No. 3,461,185. It is believed that the compositions of this invention can comprise an inhibitor from any of these classes of inhibitors.

The inhibitors may be selected from the group consisting of ethylenically unsaturated amides, aromatically unsaturated amides, acetylenic compounds, ethylenically unsaturated isocyanates, olefinic siloxanes, unsaturated hydrocarbon diesters unsaturated hydrocarbon monoesters of unsaturated acids, conjugated ene-ynes, hydroperoxides, ketones, sulfoxides, amines, phosphines, phosphites, nitrites, and diaziridines.

Preferred inhibitors for the compositions of this invention are the maleates and alkynyl alcohols.

The amount of Component (D) to be used in the compositions of this invention is not critical and can be any amount that will retard the above-described platinum-catalyzed hydrosilylation reaction at room temperature while not preventing said reaction at moderately elevated temperature, i.e. a temperature that is 25 to 50° C. above room temperature. No specific amount of inhibitor can be suggested to obtain a specified bath life at room temperature since the desired amount of any particular inhibitor to be used will depend upon the concentration and type of the platinum group metal-containing catalyst, the nature and amounts of Components (A) and (B). The range of Component (D) can be 0.1–10% by weight, preferably 0.15–2% by weight, and most preferably 0.2–1% by weight.

The compositions of the present invention may be used either as formulations that are free of solvent, i.e. 100% solids, diluted with an organic solvent that is miscible, or as an aqueous emulsion, i.e. a silicone and water emulsion. When the formulation of the present invention is used as a solventless coating, it is preferred that the viscosity of the branched alkenyl silicone in a range varying from about 100 to about 10,000 centipoise, preferably from about 125 to about 1,000, more preferably from about 150 to about 500, and most preferably from about 200 to about 300 centipoise at 25° C. This is most easily accomplished by manipulation of the ratios of the stoichiometric subscripts between the terminal M and $M^{vi}$ groups and the T groups in the formula:

$$M^{vi}{}_a T_b D_c M_d \qquad 6)$$

with one general consideration being that $a+d \geq b$. If this condition is not met, the branched alkenyl silicone becomes much more viscous. This does not defeat the applicability of the silicone as a release coating material because the silicone may be dispersed or dissolved in a suitable solvent and coated thereby.

It is generally appreciated that other components may be added to the compositions of the present invention such as bath life extenders of U.S. Pat. Nos. 5,036,117 and 5,516, 558; release additives for increasing the release force; fillers, extenders, reactive diluents, anchorage additives that improve adhesion to specific substrates, and the like.

When used as emulsions, the silicones of the present invention are generally emulsified by the addition of non-ionic surfactants, addition of water followed by processing in a colloid mill.

The laminates of the present invention comprise a substrate, a cured release coating comprising a substantially branched alkenyl silicone coated upon the substrate and a methyl or phenyl silicone pressure sensitive adhesive. The laminates of the present invention may further comprise a substrate, the cured release coating, a methyl or phenyl pressure sensitive adhesive and an additional laminate layer which may consist of one single layer or a plurality of layers. The materials useful as the substrate layer and as the layer or layers in contact with the pressure sensitive adhesive are selected from the group consisting of cellulose based substrates such as paper, film based substrates such as polyolefin films, polyester films, polyamide films and polyurethane films, and cellulose based substrates that have been coated with film forming materials derived from polyolefins, polyesters, polyamides and polyurethanes. When the laminates of the present invention comprise a substrate layer, the cured release coating, and a methyl or phenyl silicone pressure sensitive adhesive such laminates are useful as transfer tapes or sheets facilitating the transfer of the pressure sensitive adhesive from the laminate comprising the cured release coating to a second substrate which may be a single layer of material or a laminate comprising two or more layers. These releasable compositions may be used in devices where a release layer is desired such as transdermal patches, band-aids and other medical appliances The present invention provides for releasable laminates when the cured release coating contacts a methyl or phenyl silicone pressure sensitive adhesive.

Preferably the substantially branched alkenyl silicone compounds useful in the practice of the present invention comprise fluoroalkyl substituents. The fluoroalkyl substituents may be low molecular weight fluoro-alkyl moieties such as trifluoromethyl or trifluoropropyl or they may be polyfluoro-alkyl moieties independently selected from the group of fluoro-alkyl substituents:

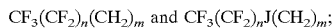

where the subscript n is an number that ranges from 0 to about 20, preferably from about 2 to about 19, more preferably from about 3 to about 18 and most preferably from about 4 to about 18, where the subscript m is a number that ranges from about 0 to about 20, preferably from about 2 to about 10, more preferably from about 2 to 8 and most preferably from about 2 to 4, and J is a divalent methylene group ($CH_2$) or oxygen (O). Preferably the substantially branched fluoro-alkyl substituted alkenyl silicone compounds of the present invention have a viscosity ranging from about 100 to about 10,000 centipoise at 25° C., preferably from about 125 to about 1,000 centipoise at 25° C., more preferably from about 150 to about 500 centipoise at 25° C., and most preferably from about 200 to about 300 centipoise at 25° C.

Silicone pressure sensitive adhesives are based on a gum (a linear silicone polymer) and a resin (a branched silicone polymer). There are two types of silicone gum used in silicone pressure sensitive adhesives, the all-methyl based gum and the phenyl modified gum. The resin is used both as a tackifier and also to adjust some of the physical properties of the pressure sensitive adhesive. Adjusting the resin-to gum ratio provides silicone pressure sensitive adhesives in a wide range of tack and peel -adhesion properties. Typically the polymers are dissolved in a solvent and chemically reacted in such a fashion that -condensation takes place. The condensation reaction of SiOH groups proceeds readily as water is removed. The physical properties of the adhesive, especially shear strength, are controlled through intra- and inter-molecular condensation. While high resin content adhesives are not tacky at room temperature, high gum content adhesives are usually extremely tacky at room temperature.

Methyl based adhesives are produced in a wide range of viscosity and physical properties with viscosities ranging from as low as 1,000 cPs to as high as 100,000 cPs. Substitution of the methyl by phenyl groups produces phenyl adhesives which generally possess between 6 and 12 mole % substitution of the methyl groups. Phenyl adhesives vary in viscosity from a low range of 6,000 to 25,000 cPs for the high phenyl content adhesive (12 mole % phenyl) to a high range of 50,000 to 100,000 cPs for the low phenyl content adhesive (6 mole % phenyl). Phenyl adhesives are distinguished by excellent holding power at temperature extremes ranging from 20° K. (−73°0 C.) to 523° K. (250° C.). The major advantage of phenyl adhesives is that they possess a unique combination of high viscosity, high peel strength and high tack. Another unique property is that they are not compatible with methyl adhesives and methyl polymers. When applied and cured over a cure film of methyl based silicone release coating, the high phenyl adhesive can be transferred to other surfaces.

All United States patents referenced herein are herewith and hereby specifically incorporated by reference.

EXPERIMENTAL

The following examples are designed to illustrate the present invention and are not to be construed as limiting the invention as embodied in these specific examples. Because the compounds and formulations are similar to those employed in U.S. Pat. No. 5,516,672, the identification of the experimental polymers hereinafter presented continues in sequence.

EXAMPLE 1

Base laminate G was prepared by coating the following bath on Kammerer AV100 glassine using a Meyer bar and curing at 300° F. for 60 seconds: 40 g of n-hexane was mixed with 0.03 -g of 3,5-dimethyl-1-hexyn-3-ol, 7.5 g of a branched polymer with the approximate structure $M^{vi}{}_{3.75}M_{0.5}T_4D_{100}$ and 0.43 g of a trimethylsilyl stopped methylhydrogen crosslinker. Then 2.5 g of a mixture of a platinum tetramethyl disiloxane complex dissolved in the previously described branched polymer was added. Base laminate H was prepared in the same manner using a branched polymer with the approximate structure $M^{vi}{}_{250}M_{0.18}T_{22}D_{100}$. Both base laminate G and H were then coated with a 50 wt. % solids solution of a PSA605™ methyl silicone based adhesive available from GE Silicones, Waterford, N.Y. The resulting coated sheets were then dried at 350° F. for 90 seconds. These sheets were then laminated with 2 mil polyester sheets. Release values were measured immediately using a delamination speed of 400in/min and then again after the laminates had been aged at 70° C. for 20 hours. The results are presented in Table 1.

EXAMPLE 2

Base laminate I was prepared by coating the following bath on Kammerer AV100 glassine using a Meyer bar and curing at 300° F. for 60 seconds: 40.0 g of n-heptane with 0.05 g of di(3-butynyl) maleate, 5.0 g of a substantially branched polymer with the approximate structure $M^{vi}{}_5Mo_{0.4}T_{5.3}D_{71}D^f{}_{30}$, where $D^f=(CF_3CH_2CH_2)(CH_3)SiO_{2/2}$, 0.58 g of a methyl hydrogen copolymer with the approximate structure $MD^H{}_{30}D^f{}_5M$, and 5.0 g of a mixture of a Pt divinyl tetramethyldisiloxane complex dissolved in the branched polymer. Base laminate I was also coated with a 50 wt. % solids solution of PSA 605 and then laminated with polyester as previously described. The release data are reported in table 1.

TABLE 1

Release of Branched Alkenyl Release Coatings Against Silicone PSA605(GE)

| Base Laminate | Initial Release, g/in | Release After 20 hr. at 70° C. |
|---|---|---|
| G | 27.1 | 32.6 |
| H | 100.7 | 55.40 |
| I | 8.5 | 10.8 |

EXAMPLE 3

The preparations of examples 1 and 2 were repeated using a different methyl silicone pressure sensitive adhesive, PSA750, also available from GE Silicones, Waterford, N.Y. The results are reported in Table 2.

TABLE 2

Release of Branched Alkenyl Release Coatings Against Silicone PSA750(GE)

| Base Laminate | Initial Release, g/in | Release After 20 hr. at 70° C. |
|---|---|---|
| G | 21.8 | 25.7 |
| H | 40.5 | 111.7 |
| I | 14.1 | 10.9 |

EXAMPLE 4

Base laminate J was prepared from a coating bath prepared by mixing 800 g of a branched polymer having the approximate structure $M^{vi}{}_{3.75}M_{0.5}T_4D_{100}$ with 150 ppm Pt as a platinum divinyl tetramethyl disiloxane complex, 4 g of diallyl maleate and 34.4 g of a trimethylsilyl stopped methyl hydrogen polysiloxane crosslinker. The bath was coated onto Kammerer AV100 glassine using three roll differential offset gravure and then the coated web was passed through an oven at 350° F. at a speed of 50 fpm. A silicone coatweight of 1.01 lb./ream was measured on the resulting material.

EXAMPLE 5

Base laminate K was prepared from a coating bath prepared by mixing 800 g of a branched polymer with the approximate structure $M^{vi}{}_{3.75}M_{0.5}RT_6D_{100}$ with 125 ppm Pt as a platinum divinyl tetramethyl disiloxane complex, 4 g of diallyl maleate and 34.4 g of a trimethylsilyl stopped methyl hydrogen polysiloxane crosslinker. The bath was coated onto Kammerer AV100 glassine using three toll differential offset gravure and then the coated web was passed through an oven at 350° F. at a speed of 50 fpm. A silicone coatweight of 1.08 lb./ream was measured on the resulting material.

EXAMPLE 6

Polyester film having a thickness of 2 mils was coated with a 50 wt. % solids formulation of PSA600, a methyl silicone pressure sensitive adhesive available from GE Silicones, Waterford, N.Y., and dried for 2 minutes at 300° F. Samples of base laminates J and K were laminated to the PSA600 coated polyester sheets. The release force was measured immediately and then after aging for 20 hours at 70° C. The release force results were obtained on a TLhMI tester by pulling the tapes at an angle of 1800 at a speed of 300 in/min. The results are presented in table 3.

TABLE 3

Release of Branched Alkenyl Release Coatings Against Silicone PSA600(GE)

| Base Laminate | Initial Release, g/in | Release After 20 hr. at 70° C. |
|---|---|---|
| J | 12.5 | 13.0 |
| K | 9.0 | 13.5 |

EXAMPLE 7

Base laminates J and K were coated with a 50 wt. % solids formulation of PSA600, a methyl silicone pressures sensitive adhesive available from GE Silicones, Waterford, N.Y., and dried for 2 minutes at 300° F., producing respectively base laminates L and M. Base laminates L and M were laminated against an uncoated polyester film. Release testing was as described in example 6. Results are presented in table 4.

TABLE 4

Release of Branched Alkenyl Release Coatings Against Silicone PSA600(GE)-Transfer-Coated

| Base Laminate | Initial Release, g/in | Release After 20 hr. at 70° C. |
|---|---|---|
| L | 12.0 | 12.5 |
| M | 12.5 | 15.5 |

EXAMPLE 8

Base laminates N and O were prepared from a coating bath that was prepared by mixing 40 g n-hexane with 0.04 g 3,5-dimethyl-1-hexyn-3-ol, 10.0 g of a substantially branched polymer having the approximate structure $M^{vi}{}_{40.4}T_{4.5}D_{85}D^f{}_{15}$, where $D^f=(CF_3CH_2CH_2)(CH_3)SiO_{2/2}$, 0.43 of a trimethylsilyl stopped methylhydrogen polysiloxane crosslinker, and 0.014 of a Pt divinyl tetramethyldisiloxane complex. This bath was coated onto two sheets of AV100 glassine paper and cured at 300° F. for 60 seconds to give coated liners. One of these two sheets was coated with a 50 wt. % solids solution of PSA750-D1 (a methylsilicone PSA available from GE Silicones, Waterford, N.Y.), dried at 300° F. for 2 minutes and then laminated with a polyester sheet, base laminate N. A sheet of polyester was coated with a 50 wt. % solids solution of PSA750-D1 and the pressure sensitive adhesive coated polyester was laminated onto (against) the AV100 glassine coated with the substantially branched polymer, base laminate O. Results of release force testing are presented in table 5.

EXAMPLE 9

Base laminates P and Q were prepared from a coating bath that was prepared by mixing 40 g n-hexane with 0.04 g 3,5-dimethyl-1-hexyn-3-ol, 10.0 g of a substantially branched polymer having the approximate structure $M^{vi}D^{f}_{96}M^{vi}$, where $D^{f}=(CF_3CH_2CH_2)(CH_3)SiO_{2/2}$, 0.43 of a trimethylsilyl stopped methylhydrogen polysiloxane crosslinker, and 0.014 of a Pt divinyl tetramethyldisiloxane complex. The linear polymer, $M^{vi}D^{f}_{96}M^{vi}$, used in this example has approximately the same vinyl content and trifluoropropyl content as the substantially branched polymer of example 8. This bath was coated onto two sheets of AV100 glassine paper and cured at 300° F. for 60 seconds to give coated liners. One of these two sheets was coated with a 50 wt. % solids solution of PSA750-D1 (a methylsilicone PSA available from GE Silicones, Waterford, N.Y.), dried at 300° F. for 2 minutes and then laminated with a polyester sheet, base laminate P. A sheet of polyester was coated with a 50 wt. % solids solution of PSA750-D1 and the pressure sensitive adhesive coated polyester was laminated onto (against) the AV100 glassine coated with the substantially branched polymer, base laminate Q. Results of release force testing are presented in table 5.

TABLE 5

Release of Branched vs. Linear Trifluoropropyl Alkenyl Release Coatings Against Silicone PSA750-D1(GE)

| Base Laminate | Initial Release, g/in |
| --- | --- |
| N | 27 |
| O | 17 |
| P | Tear |
| Q | 159 |

The data in Table 5 clearly demonstrates that substantially branched alkenyl silicones comprising trifluoropropyl substituents exhibit improved performance relative to their linear counterparts, i.e. lower release force.

EXAMPLE 10

A coating bath was prepared by mixing 800 g of a branched polymer having the approximate structure $M^{vi}_{3.75}M_{0.5}T_4D_{100}$, with 150 ppm Pt as a platinum divinyl tetramethyl disiloxane complex, 4 g of diallyl maleate and 36.2 g of a trimethylsilyl stopped methylhydrogen polysiloxane crosslinker. The coating bath was coated onto Kammerer AV100 glassine using three roll differential offset gravure and then the coated web was passed through an oven at a speed of 50 fpm at a temperature of 350° F. A silicone coatweight of 0.98 lb./ream was measured on the resulting coated material. This material is designated as base laminate R. Results are presented in table 6.

EXAMPLE 11

A coating bath was prepared by mixing 600 g of a branched polymer having the approximate structure $M^{vi}_{3.75}M_{0.5}T_4D_{100}$, with 200 g of a linear vinyl polymer with the approximate structure MviDvi3D125Mvi, with 150 ppm Pt as a platinum divinyl tetramethyl disiloxane complex, 4 g of diallyl maleate and 37.0 g of a trimethylsilyl stopped methylhydrogen polysiloxane crosslinker. The coating bath was coated onto Kammerer AV100 glassine using three roll differential offset gravure and then the coated web was passed through an oven at a speed of 50 fpm at a temperature of 350° F. A silicone coatweight of 1.04 lb./ream was measured on the resulting coated material. This material is designated as base laminate S. Results are presented in table 6.

EXAMPLE 12

A coating bath was prepared by mixing 800 g of a branched polymer having the approximate structure $M^{vi}_{4.70}M_{0.7}T_{6.0}D_{76}D^{f}_{12}$, where $D^{f}=(CF_3CH_2CH_2)(CH_3)SiO_{2/2}$, with 150 ppm Pt as a platinum divinyl tetramethyl disiloxane complex, 4 g of diallyl maleate and 45.0 g of a crosslinker blend of 70 wt. % $MD_{30}HDf_5M$ and 30 wt. % of a trimethylsilyl stopped methylhydrogen polysiloxane crosslinker. The coating bath was coated onto Kammerer AV100 glassine using three roll differential offset gravure and then the coated web was passed through an oven at a speed of 50 fpm at a temperature of 350° F. A silicone coatweight of 0.98 lb./ream was measured on the resulting coated material. This material is designated as base laminate T. Results are presented in table 6.

Base laminates R, S, and T were coated with a 50 wt. % solids solution of PSA750-D1. Base laminates R, S and T were also coated with a phenyl silicone pressure sensitive adhesive PSA6574 available from GE Silicones, Waterford, N.Y. and are respectively base laminates U (corresponding to R), V(corresponding to S), and W (corresponding to T). Release testing results are reported in table 6.

TABLE 6

Release of Branched Alkenyl Release Coatings Against Silicone PSA750-D1 or PSA6574

| Base Laminate | Initial Release, g/in | Release After 20 hr. at 70° C. | Release After 1 Week at 70° C. |
| --- | --- | --- | --- |
| R | 10 | 8 | 18 |
| S | 22 | 18.5 | 35 |
| T | 5 | 5 | 10 |
| U | 18 | 26 | NM |
| V | 40 | 78 | NM |
| W | 14 | 16 | NM |

This comparison demonstrates that the addition of 25 wt. % linear polymer as in base laminate S results in a higher release force with a methyl silicone pressure sensitive adhesive. Higher release results from the incorporation of 25 wt. % linear polymer whether the pressure sensitive adhesive is a methyl silicone or a phenyl silicone, base laminate V.

EXAMPLE 13

By diluting a substantially branched polymer with a linear polymer the release force can be changed, usually increased. This enables the preparation of a plurality of laminate release layers each having a different release force whereby other adherent layers either as a single lamina or as laminates may be transferred between substrates by means of the difference in release force. Thus for example, base laminate R was coated with a pressure sensitive adhesive, PSA750-D1. The coated base laminate was laminated onto (against) base laminate S. The pressure sensitive adhesive originally laminated onto base laminate R, and separating base laminate R from base laminate S was transferred to base laminate S with a release force of 8.5 g/in. As a result of this lamination followed by a differential delamination, base laminate S was coated with the pressure sensitive adhesive originally coated onto base laminate R. The pressure sensitive adhesive coated base laminate S was laminated onto a polyester sheet followed by differential delamination. By reason of the differential delamination of coated base laminate S, the polyester sheet was coated with the pressure sensitive adhesive, the measured release force was 32 g/in.

EXAMPLE 14

A coating bath was prepared by mixing 40 g of n-hexane, 10.0 g of a linear vinyl dimethylsilyl chainstopped polydimethylsiloxane having a viscosity of 225 cps at 25° C., 0.014 g of a Pt divinyl tetramethyl di siloxane complex, 0.04 g diallyl maleate, and 0.33 g trimethylsilyl stopped methylhydrogen polysiloxane crosslinker. This bath was coated onto Kammerer AV100 glassine and cured at 300° F. for 60 seconds to a coated liner, base laminate W.

EXAMPLE 15

A coating bath was prepared by mixing 40 g of n-hexane, 10.0 g of a linear vinyl dimethylsilyl chainstopped dimethylmethylvinyl polysiloxane copolymer having a viscosity of 275 cps at 25° C., 0.014 g of a Pt divinyl tetramethyl di siloxane complex, 0.04 g diallyl maleate, and 0.50 g trimethylsilyl stopped methylhydrogen polysiloxane crosslinker. This bath was coated onto Kammerer AV100 glassine and cured at 300° F. for 60 seconds to a coated liner, base laminate X.

EXAMPLE 16

A coating bath was prepared by mixing 40 g of n-hexane, 10.0 g of a substantially branched polymer with the approximate structure $M^{vi}_{3.75}M_{0.5}T_{4.0}D_{100}$, 0.014 g of a Pt divinyl tetramethyl di siloxane complex, 0.04 g diallyl maleate, and 0.33 g trimethylsilyl stopped methylhydrogen polysiloxane crosslinker. This bath was coated onto Kammerer AV100 glassine and cured at 300° F. for 60 seconds to a coated liner, base laminate Y.

EXAMPLE 17

A coating bath was prepared by mixing 40 g of n-hexane, 10.0 g of a linear polymer with the approximate structure $M^{vi}D^{vi}_{2.5}D_{96}D^{f}_{16}D^{f}_{16}M^{vi}$, where Df=$(CF_3CH_2CH_2)(CH_3)SiO_{2/2}$, 0.014 g of a Pt divinyl tetramethyl di siloxane complex, 0.04 g diallyl maleate, and 0.40 g trimethylsilyl stopped methylhydrogen polysiloxane crosslinker. This bath was coated onto Kammerer AV100 glassine and cured at 300° F. for 60 seconds to a coated liner, base lamninate Z.

EXAMPLE 18

A coating bath was prepared by mixing 40 g of n-hexane, 10.0 g of a substantially branched polymer with the approximate structure $M^{vi}_{4.0}M_{0.4}T_{4.5}D_{85}D^{f}_{15}$, where Df=$(CF_3CH_2CH_2)(CH_3)SiO_{2/2}$, 0.014 g of a Pt divinyl tetramethyl di siloxane complex, 0.04 g diallyl maleate, and 0.40 g trimethylsilyl stopped methylhydrogen polysiloxane crosslinker. This bath was coated onto Kammerer AV100 glassine and cured at 300° F. for 60 seconds to a coated liner, base laminate AA.

Each of the base laminates (or liner sheets) from examples 14 through 18 were coated with a 50 wt. % solution of PSA6574 ( a phenyl silicone pressure sensitive adhesive) dried for 2 minutes at 300° F. and then laminated with polyester sheet (or film). The release force of the laminates was measured at 300 ipm and again after 20 hours aging at 70° C. The results are presented in table 7.

TABLE 7

Release Force of Various Release Coatings Against Silicone PSA6574

| Base Laminate | Initial Release, g/in | Release After 20 hr. at 70° C. |
|---|---|---|
| W | >400 | Lockup |
| X | 46 | Tear |
| Y | 8.5 | 14 |

TABLE 7-continued

Release Force of Various Release Coatings Against Silicone PSA6574

| Base Laminate | Initial Release, g/in | Release After 20 hr. at 70° C. |
|---|---|---|
| Z | 19.5 | 30 |
| AA | 7 | 11.5 |

These results demonstrate that the substantially branched alkenyl silicones (substantially branched polymers) gave lower release than their linear silicone counterparts even when using a phenyl silicone pressure sensitive adhesive.

Having described the invention that which is claimed is:

1. A release laminate comprising:

a) a first laminate layer comprising a cured silicone composition comprising a substantially branched alkenyl silicone having the formula:

$M^{vi}_a T_b D_c M_d$ where $M^{vi}=R_{3-p}R^1_p SiO_{1/2}$, where R is selected from the one to forty carbon monovalent hydrocarbon radicals and $R^1$ is selected from the two to forty carbon atom terminal olefinic monovalent hydrocarbon radicals, where p ranges from 1 to 3;

$T=R^2SiO_{3/2}$ where $R^2$ is selected from the group consisting of R and $R^1$;

$D=R^3R^4SiO_{2/2}$ where $R^3$ and $R^4$ are each independently selected from the group consisting of R and $R^1$; and $M=R_3SiO/_{1/2}$ where each R is as previously defined and is independently selected; wherein a and b have values ranging from 2 to 5, c is an integer ranging from about 50 to about 1,000 and d has a value ranging from 0 to about 0.5; and b) a second laminate layer in contact with the first layer comprising a silicone pressure sensitive adhesive.

2. The laminate of claim 1 wherein the silicone composition additionally comprises a substantially linear hydrogen siloxane selected from the group of compounds:

$MD_eD'_fM$, $MD'_fM$, $MD_eD'_fM'$, $M'D_eD'_fM'$, and $M'D_eM'$ where $M=R'_3SiO/_{1/2}$, $M'=H_gR'_{3-g}SiO_{1/2}$, and $D=R'R'SiO_{2/2}$, and $D'=R'HSiO_{2/2}$ wherein each R' in M, M', D, and D' is independently selected from the one to forty carbon monovalent hydrocarbon radicals wherein the subscripts e and f may be zero or positive whereby the sum of e and f ranges from about 10 to about 100 subject to the limitation that the sum of f and g is two or greater.

3. The laminate of claim 2 wherein the substantially linear hydrogen siloxane is selected from the group consisting of $$MD_eD'_fM,$$

$$MD'_fM,$$

and mixtures thereof.

4. The laminate of claim 3 wherein R is selected from the group consisting of monovalent substituents having the formula:

$$CF_3(CF_2)_n(CH_2)_m \text{ and } CF_3(CF_2)_nJ(CH_2)_m;$$

where the subscript n is an number that ranges from 0 to about 20, the subscript m is a number that ranges from 0 to about 20 and J is a divalent methylene group ($CH_2$) or oxygen (O) or methyl.

5. The laminate of claim 4 wherein R' is selected from the group consisting of monovalent substituents having the formula:

$$CF_3(CF_2)_n(CH_2)_m \text{ and } CF_3(CF_2)_nJ(CH_2)_m;$$

where the subscript n is an number that ranges from 0 to about 20, the subscript m is a number that ranges from 0 to about 20 and J is a divalent methylene group ($CH_2$) or oxygen (O) or methyl.

6. The laminate of claim 5 wherein the subscripts a, b, and d satisfy the relationship a+d≧b.

7. A release laminate comprising:
   a) a first laminate layer comprising a cured silicone and water emulsion comprising a substantially branched alkenyl silicone having the formula:

$$M^{vi}{}_aT_bD_cM_d$$

where
   $M^{vi}=R_{3-p}R^1{}_pSiO_{1/2}$, where R is selected from the group consisting of one to forty carbon monovalent hydrocarbon radicals and $R^1$ is selected from the two to forty carbon atom terminal olefinic monovalent hydrocarbon radicals, where p ranges from 1 to 3;
   $T=R^2SiO_{3/2}$ where $R^2$ is selected from the R and $R^1$;
   $D=R^3R^4SiO_{2/2}$ where $R^3$ and $R^4$ are each independently selected from the group consisting of R and $R^1$; and
   $M=R_3SiO_{1/2}$ where each R is as previously defined and is independently selected; wherein a and b have values ranging from 2 to 5, c is an integer ranging from about 50 to about 1,000 and d has a value ranging from 0 to about 0.5; and b) a second laminate layer in contact with the first layer comprising a silicone pressure sensitive adhesive.

8. The laminate of claim 7 wherein the silicone and water emulsion additionally comprises a substantially linear hydrogen siloxane selected from the group of compounds:

$$MD_eD'_fM,$$

$$MD'_fM,$$

$$MD_eD'_fM',$$

$$M'D_eD'_fM',$$

$$M'D_eM'$$

where $$M=R'_3SiO_{1/2},$$

$$M'=H_gR'_{3-g}SiO_{1/2},$$

and $$D=R'R'SiO_{2/2},$$

and $D'=R'HSiO_{2/2}$ wherein each R' in M, M', D, and D' is independently selected from the one to forty carbon monovalent hydrocarbon radicals wherein the subscripts e and f may be zero or positive whereby the sum of e and f ranges from about 10 to about 100 subject to the limitation that the sum of f and g is two or greater.

9. The laminate of claim 8 wherein the substantially linear hydrogen siloxane is selected from the group consisting of $$MD_eD'_fM,$$

$$MD'_fM,$$

and mixtures thereof.

10. The laminate of claim 9 wherein R is selected from the group consisting of monovalent substituents having the formula:

$$CF_3(CF_2)_n(CH_2)_m \text{ and } CF_3(CF_2)_nJ(CH_2)_m;$$

where the subscript n is an number that ranges from 0 to about 20, the subscript m is a number that ranges from 0 to about 20 and J is a divalent methylene group ($CH_2$) or oxygen (O) or methyl.

11. The laminate of claim 10 wherein R' is selected from the group consisting of monovalent substituents having the formula:

$$CF_3(CF_2)_n(CH_2)_m \text{ and } CF_3(CF_2)_nJ(CH_2)_m;$$

where the subscript n is an number that ranges from 0 to about 20, the subscript m is a number that ranges from 0 to about 20 and J is a divalent methylene group ($CH_2$) or oxygen (O) or methyl.

12. The laminate of claim 11 wherein the subscripts a, b, and d satisfy the relationship a+d≧b.

13. A release laminate comprising:
   a) a substrate;
   b) a first laminate layer contacting said substrate comprising a cured silicone composition comprising a substantially branched alkenyl silicone having the formula:

$$M^{vi}{}_aT_bD_cM_d$$

where
   $M^{vi}=R_{3-p}R^1{}_pSiO_{1/2}$, where R is selected from one to forty carbon monovalent hydrocarbon radicals and $R^1$ is selected from the two to forty carbon atom terminal olefinic monovalent hydrocarbon radicals, where p ranges from 1 to 3;
   $T=R^2SiO_{3/2}$ where $R^2$ is selected from the group consisting of R and $R^1$;

$D=R^3R^4SiO_{2/2}$ where $R^3$ and $R^4$ are each independently selected from the group consisting of R and $R^1$; and $M=R_3SiO_{1/2}$ where each R is as previously defined and is independently selected; wherein a and b have values ranging from 2 to 5, c is an integer ranging from about 50 to about 1,000 and d has a value ranging from 0 to about 0.5; and b) a second laminate layer contacting the first laminate layer comprising a silicone pressure sensitive adhesive wherein the second laminate layer does not contact the substrate.

14. The laminate of claim 13 wherein the silicone composition additionally comprises a substantially linear hydrogen siloxane selected from the group of compounds:

$$MD_eD'_fM,$$

$$MD'_fM,$$

$$MD_eD'_fM',$$

$$M'D_eD'_fM',$$

and $$M'D_eM'$$

where $$M=R'_3SiO_{1/2},$$

$$M'=H_gR'_{3-g}SiO_{1/2},$$

and $$D=R'R'SiO_{2/2},$$

and $D'=R'HSiO_{2/2}$ wherein each R' in M, M', D, and D' is independently selected from the one to forty carbon monovalent hydrocarbon radicals wherein the subscripts e and f may be zero or positive whereby the sum of e and f ranges from about 10 to about 100 subject to the limitation that the sum of f and g is two or greater.

15. The laminate of claim 14 wherein the substantially linear hydrogen siloxane is selected from the group consisting of $$MD_eD'_fM,$$

$$MD+_fM,$$

and mixtures thereof.

16. The laminate of claim 15 wherein R is selected from the group consisting of monovalent substituents having the formula:

$$CF_3(CF_2)_n(CH_2)_m \text{ and } CF_3(CF_2)_nJ(CH_2)_m;$$

where the subscript n is an number that ranges from 0 to about 20, the subscript m is a number that ranges from 0 to about 20 and J is a divalent methylene group ($CH_2$) or oxygen (O) or methyl.

17. The laminate of claim 16 wherein R' is selected from the group consisting of monovalent substituents having the formula:

$$CF_3(CF_2)_n(CH_2)_m \text{ and } CF_3(CF_2)_nJ(CH_2)_m;$$

where the subscript n is an number that ranges from 0 to about 20, the subscript m is a number that ranges from 0 to about 20 and J is a divalent methylene group ($CH_2$) or oxygen (O) or methyl.

18. The laminate of claim 17 wherein the subscripts a, b, and d satisfy the relationship $a+d \geq b$.

19. A release laminate comprising:

a) a substrate;

b) a first laminate layer contacting said substrate comprising a cured silicone and water emulsion comprising a substantially branched alkenyl silicone having the formula:

$$M^{vi}_aT_bD_cM_d$$

where $M^{vi}=R_{3-p}R^1_pSiO_{1/2}$, where R is selected from the group consisting of one to forty carbon monovalent hydrocarbon radicals and $R^1$ is selected from the two to forty carbon atom terminal olefinic monovalent hydrocarbon radicals, where p ranges from 1 to 3;

$T=R^2SiO_{3/2}$ where $R^2$ is selected from the group consisting of R and $R^1$;

$D=R^3R^4SiO_{2/3}$ where $R^3$ and $R^4$ are each independently selected from the group consisting of R and $R^1$; and $M=R_3SiO_{1/2}$ where each R is as previously defined and is independently selected; wherein a and b have values ranging from 2 to 5, c is an integer ranging from about 50 to about 1,000 and d has a value ranging from 0 to about 0.5; and b) a second laminate layer contacting the first laminate layer comprising a silicone pressure sensitive adhesive wherein the second laminate layer does not contact the substrate.

20. The laminate of claim 19 wherein the silicone and water additionally comprises a substantially linear hydrogen siloxane selected from the group of compounds:

$$MD_eD'_fM,$$

$$MD'_fM,$$

$$MD_eD'_fM',$$

$$M'D_eD'_fM',$$

and $$M'D_eM'$$

where $$M=R'_3SiO_{1/2},$$

$$M'=H_gR'_{3-g}SiO_{1/2},$$

and $$D=R'R'SiO_{2/2},$$

and $D=R'HSiO_{2/2}$ wherein each R' in M, M', D, and D' is independently selected from the one to forty carbon monovalent hydrocarbon radicals wherein the subscripts e and f may be zero or positive whereby the sum of e and f ranges from about 10 to about 100 subject to the limitation that the sum of f and g is two or greater.

21. The laminate of claim 20 wherein the substantially linear hydrogen siloxane is selected from the group consisting of $MD_eD'_fM$, $MD'_fM$, and mixtures thereof.

22. The laminate of claim 21 wherein R is selected from the group consisting of monovalent substituents having the formula:

$$CF_3(CF_2)_n(CH_2)_m \text{ and } CF_3(CF_2)_nJ(CH_2)_m;$$

where the subscript n is an number that ranges from 0 to about 20, the subscript m is a number that ranges from 0 to about 20 and J is a divalent methylene group ($CH_2$) or oxygen (O) or methyl.

23. The laminate of claim 22 wherein R' is selected from the group consisting of monovalent substituents having the formula:

$$CF_3(CF_2)_n(CH_2)_m \text{ and } CF_3(CF_2)_nJ(CH_2)_m;$$

where the subscript n is an number that ranges from 0 to about 20, the subscript m is a number that ranges from 0 to about 20 and J is a divalent methylene group ($CH_2$) or oxygen (O) or methyl.

24. The laminate of claim 23 wherein the subscripts a, b, and d satisfy the relationship $a+d \geq b$.

25. A release laminate consisting essentially of:

a) a first laminate layer consisting essentially of a cured silicone composition comprising a substantially branched alkenyl silicone having the formula:

$$M^{vi}_a T_b D_c M_d$$

where $M^{vi} = R_{3-p}R^1_p SiO_{1/2}$, where R is selected from the group consisting of one to forty carbon monovalent hydrocarbon radicals and $R^1$ is selected from the two to forty carbon atom terminal olefinic monovalent hydrocarbon radicals, where p ranges from 1 to 3;

$T = R^2 SiO_{3/2}$ where $R^2$ is selected from the group consisting of R and $R^1$;

$D = R^3 R^4 SiO_{2/2}$ where $R^3$ and $R^4$ are each independently selected from the group consisting of R and $R^1$; and $M = R_3 SiO_{1/2}$ where each R is as previously defined and is independently selected; wherein a and b have values ranging from 2 to 5, c is an integer ranging from about 50 to about 1,000 and d has a value ranging from 0 to about 0.5; and b) a second laminate layer in contact with the first layer consisting essentially of a silicone pressure sensitive adhesive.

* * * * *